(12) United States Patent
Kakiuchi et al.

(10) Patent No.: US 8,517,451 B2
(45) Date of Patent: Aug. 27, 2013

(54) FRONT UNDERFLOOR STRUCTURE OF VEHICLE

(75) Inventors: Takeshi Kakiuchi, Fujisawa (JP); Masahiro Ataka, Ebina (JP); Youhei Ogawa, Atsugi (JP); Kazuaki Nakajima, Yokohama (JP); Yuji Ishihara, Zushi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/639,211

(22) PCT Filed: Apr. 7, 2011

(86) PCT No.: PCT/JP2011/058839
§ 371 (c)(1),
(2), (4) Date: Oct. 4, 2012

(87) PCT Pub. No.: WO2011/126085
PCT Pub. Date: Oct. 13, 2011

(65) Prior Publication Data
US 2013/0026783 A1   Jan. 31, 2013

(30) Foreign Application Priority Data

Apr. 8, 2010   (JP) .................................. 2010-089336

(51) Int. Cl.
*B62D 35/00* (2006.01)
(52) U.S. Cl.
USPC ..................................... 296/180.1; 296/180.5

(58) Field of Classification Search
USPC ............................................ 296/180.1, 180.5
See application file for complete search history.

(56) References Cited

U.S. PATENT DOCUMENTS 5,322,340 A * 6/1994 Sato et al. .................. 296/180.1

FOREIGN PATENT DOCUMENTS

| DE | 102007045004 A1 | 4/2009 |
|---|---|---|
| EP | 2 039 595 A1 | 3/2009 |
| JP | 7-52836 A | 2/1995 |
| JP | 11-91642 A | 4/1999 |
| JP | 2006-240581 A | 9/2006 |
| JP | 2007-90976 A | 4/2007 |
| JP | 2007-253657 A | 10/2007 |
| JP | 2008-13013 A | 1/2008 |
| JP | 2008-201156 A | 9/2008 |
| JP | 2008-279819 A | 11/2008 |

* cited by examiner

*Primary Examiner* — Joseph Pape
(74) *Attorney, Agent, or Firm* — Foley & Lardner LLP

(57) ABSTRACT

A front underfloor structure of a vehicle includes front deflectors disposed forward of front tires, respectively. The front deflectors each include a front apex portion disposed at a position closer to the vehicle front than a leading edge surface of each of the front tires when straight, and disposed at a position closer to a vehicle center line than an inner surface of each of the front tires when straight; an outer end portion disposed at a position closer to the vehicle rear than the front apex portion, and disposed at a position outward in the vehicle width direction of the front apex portion; and a second flow redirection surface connecting the front apex portion and the outer end portion, and being configured such that, when struck by air traveling from the vehicle front, the second flow redirection surface redirects a flow of the traveling air outward in the vehicle.

5 Claims, 11 Drawing Sheets

View A

SEC : B-B

SEC : C-C

SEC : D-D

CLASSIFICATION OF
SOURCES OF AIR DRAG

1

FRONT UNDERFLOOR STRUCTURE OF VEHICLE

TECHNICAL FIELD

The present invention relates to a front underfloor structure of a vehicle, including front deflectors to redirect a flow of traveling air that flows around a front underfloor.

BACKGROUND ART

The following front underfloor structure of a vehicle for redirecting a flow of traveling air that flows around a front underfloor has heretofore been known. Specifically, in the structure, a pair of left and right horseshoe-shaped front deflectors are provided forward of a pair of left and right front wheel houses, respectively, in the vehicle (refer to Patent Literature 1, for example).

The conventional front underfloor structure of the vehicle is intended both to achieve brake cooling characteristics by ensuring a flow of traveling air that flows toward braking devices for front tires, and to reduce a drag coefficient of the vehicle taken as a whole by restricting a rate of flow of traveling air that flows into the front wheel houses.

CITATION LIST

Patent Literature

Patent Literature 1: Japanese Patent Application Publication No. 2008-279819

SUMMARY OF INVENTION

Technical Problem

However, in the conventional front underfloor structure of the vehicle, front apex portions of the horseshoe-shaped front deflectors are disposed at positions closer to the vehicle front than the positions of leading edge surfaces of the front tires when straight, and at positions outward in a vehicle width direction of the positions of inner surfaces of the front tires when straight, or equivalently, at positions overlapping with the front tires when straight, in the vehicle width direction.

In other words, the conventional structure is configured to actively ensure a flow of traveling air that flows toward the braking devices, not taking it into account that a flow of traveling air that collides with the front tires or front suspensions becomes a cause of an increase in air drag on the front underfloor of the vehicle. Also, the conventional structure is such that a streamline of traveling air that flows in from the vehicle front toward the front tires is a streamline parallel to a vehicle longitudinal direction, not taking it into account that a streamline diverging in the vehicle width direction, flowing toward the vehicle rear, is drawn (refer to FIG. 6 of Patent Literature 1).

Thus, while traveling, a higher-than-expected rate of flow of traveling air collides with the front tires or the front suspension and flows into the front wheel houses. As a result, a problem exists; that is, a flow of traveling air that flows around the front underfloor is disturbed, a turbulent flow in which many vortex structures (e.g. vortex tubes and vortex layers) are present is produced in front tire regions, the vortex structures gradually grow and hence increase air drag, and therefore, desired improvements in aerodynamic characteristics cannot be expected.

The present invention has been made in view of the foregoing problems. An object of the present invention is to provide a front underfloor structure of a vehicle, which is capable of reducing air drag produced by a flow of traveling air that flows around a front underfloor while traveling, thereby achieving desired improvements in aerodynamic characteristics.

Solution to Problem

In order to attain the above object, according to the present invention, there is provided a front underfloor structure of a vehicle, including front deflectors disposed forward of front tires, respectively, in the vehicle and being configured to redirect a flow of traveling air that flows around a front underfloor while traveling, wherein the front deflectors each include a front apex portion, an outer end portion, and a flow redirection surface. The front apex portion is disposed at a position closer to the vehicle front than the position of a leading edge surface of each of the front tires when straight, and is disposed at a position closer to a vehicle center line which is inward in a vehicle width direction of the position of an inner surface of each of the front tires when straight. The outer end portion is disposed at a position closer to the vehicle rear than the front apex portion, and is disposed at a position outward in the vehicle width direction of the front apex portion. The flow redirection surface connects the front apex portion and the outer end portion, and is configured such that, when struck by air traveling from the vehicle front, the flow redirection surface redirects a flow of the traveling air outward in the vehicle.

DESCRIPTION OF EMBODIMENTS

Figure 1:
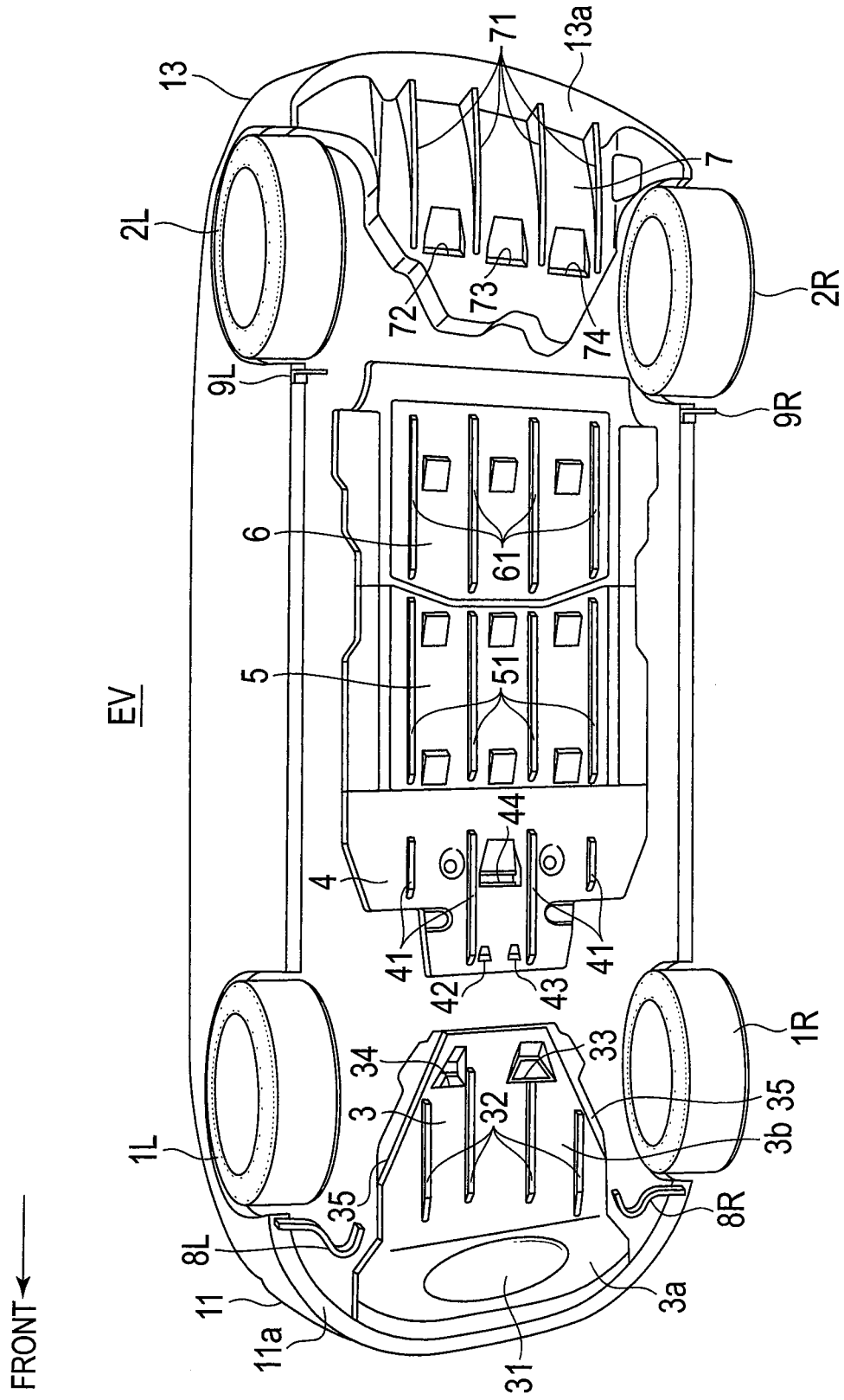
FIG. 1 is a perspective view showing an overall underfloor structure of an electric vehicle (as an example of a vehicle) to which a front underfloor structure of an embodiment 1 is applied.

Best mode for carrying out a front underfloor structure of a vehicle of the present invention will be described below with reference to an embodiment 1 shown in the drawings. Incidentally, in the following description, the front and the rear in a vehicle longitudinal direction will be referred to as "the vehicle front" and "the vehicle rear," respectively. Also, a central axis extending in the vehicle longitudinal direction, in a bottom view of the vehicle, will be referred to as a vehicle center line CL. A direction closer to the vehicle center line CL, in a vehicle width direction, will be referred to as "inward in the vehicle," and a direction farther away from the vehicle center line CL, in the vehicle width direction, will be referred to as "outward in the vehicle." The side close to the vehicle center line CL, in the vehicle width direction, will be referred to as "inward in the vehicle width direction," and the side far away from the vehicle center line CL, in the vehicle width direction, will be referred to as "the outward in the vehicle width direction."

First Embodiment

Firstly, a configuration will be described.

FIG. 1 is a perspective view showing an overall underfloor structure of an electric vehicle (as an example of the vehicle) to which the front underfloor structure of the embodiment 1 is applied. The overall underfloor structure will be described below with reference to FIG. 1.

As shown in FIG. 1, the overall underfloor structure of an electric vehicle EV of the embodiment 1 includes a pair of left and right front tires 1L, 1R, a pair of left and right rear tires 2L, 2R, a front undercover 3, a motor room rear undercover 4, a first battery undercover 5, a second battery undercover 6, a rear undercover 7, a pair of left and right front deflectors 8L, 8R, and a pair of left and right rear deflectors 9L, 9R.

Figure 2:
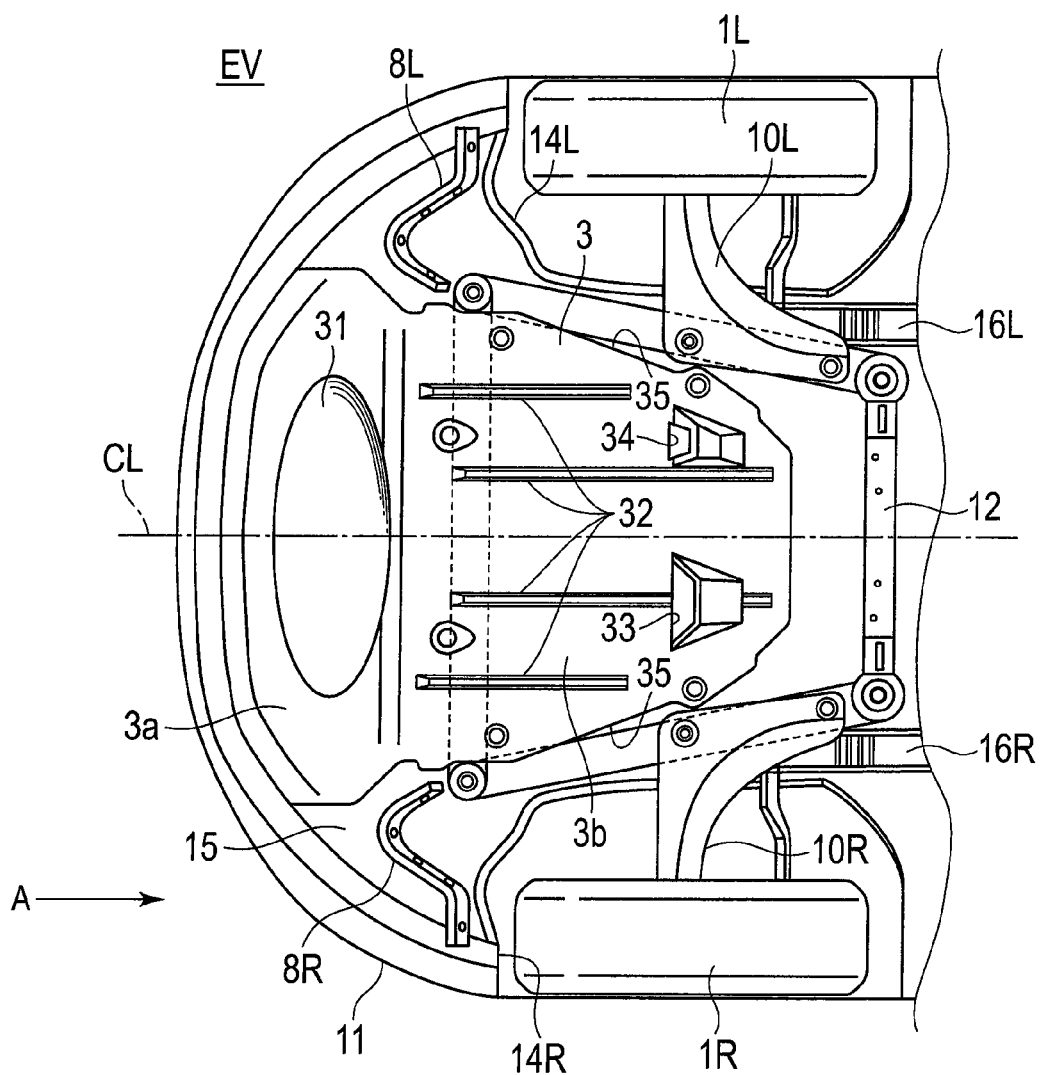
FIG. 2 is a bottom view showing the front underfloor structure of the embodiment 1.

The pair of left and right front tires 1L, 1R serve both as steering wheels and as drive wheels, and are resiliently mounted to a vehicle body through front suspension links 10L, 10R, respectively (see FIG. 2).

The pair of left and right rear tires 2L, 2R are resiliently mounted to the vehicle body through rear suspensions (unillustrated) such as trailing type suspensions.

The front undercover 3 is a member that covers a front underfloor region extending from a flange portion 11a of a front bumper fascia 11 to a front suspension member 12 (see FIG. 2). A cover surface of the front undercover 3 is formed as a smooth bent surface by an inclined portion 3a inclined downward toward the vehicle rear, and a horizontal portion 3b that is continuous with the inclined portion 3a. The inclined portion 3a is provided with a protruding portion with curved surface 31 having a rugby ball shape having a major axis in the vehicle width direction, and the horizontal portion 3b is provided with four protrusions 32 extending in the vehicle longitudinal direction, and two drain holes 33, 34.

The motor room rear undercover 4 is a member that covers a central front underfloor region extending from the front suspension member 12 (see FIG. 2) to a rear portion of a motor room. A cover surface of the motor room rear undercover 4 is formed as a horizontal surface at the same position as the horizontal portion 3b of the front undercover 3. The motor room rear undercover 4 is provided with four protrusions 41 extending in the vehicle longitudinal direction, two drain holes 42, 43 having a small opening area, which are formed toward the vehicle front, and a drain hole 44 having a large opening area, which is formed toward the vehicle rear.

The first battery undercover 5 and the second battery undercover 6 are members connected together to cover a central rear underfloor region extending from the rear portion of the motor room to a rear end portion of a battery unit (unillustrated). Cover surfaces of the battery undercovers 5, 6 are formed as horizontal surfaces at the same position as the cover surface of the motor room rear undercover 4. The battery undercovers 5, 6 are provided with four protrusions 51, 61 each, respectively, extending in the vehicle longitudinal direction. Incidentally, the motor room rear undercover 4 and the battery undercovers 5, 6 are connected together to form a center undercover as a whole.

The rear undercover 7 is a member that covers a rear underfloor region extending from a rear suspension member (unillustrated) to a flange portion 13a of a rear bumper fascia 13. A cover surface of the rear undercover 7 has a diffuser structure formed as an inclined surface inclined upward toward the vehicle rear, extending from the position of the same horizontal surface as the second battery undercover 6. The rear undercover 7 is provided with four protrusions 71 which extend in the vehicle longitudinal direction and increase gradually in height toward the vehicle rear, and three drain holes 72, 73, 74 disposed at positions between the protrusions 71.

The pair of left and right front deflectors 8L, 8R are disposed at forward positions forward of the pair of left and right front tires 1L, 1R, respectively, protruding downward from the forward positions, thereby to redirect a flow of traveling air that flows around the front tires 1L, 1R while traveling. Incidentally, "traveling air" refers to a relative flow of air formed around the vehicle during the vehicle's traveling.

The pair of left and right rear deflectors 9L, 9R are disposed at forward positions forward of the pair of left and right rear tires 2L, 2R, respectively, protruding downward from the forward positions, thereby to redirect a flow of traveling air that flows around the rear tires 2L, 2R while traveling.

Figure 3:
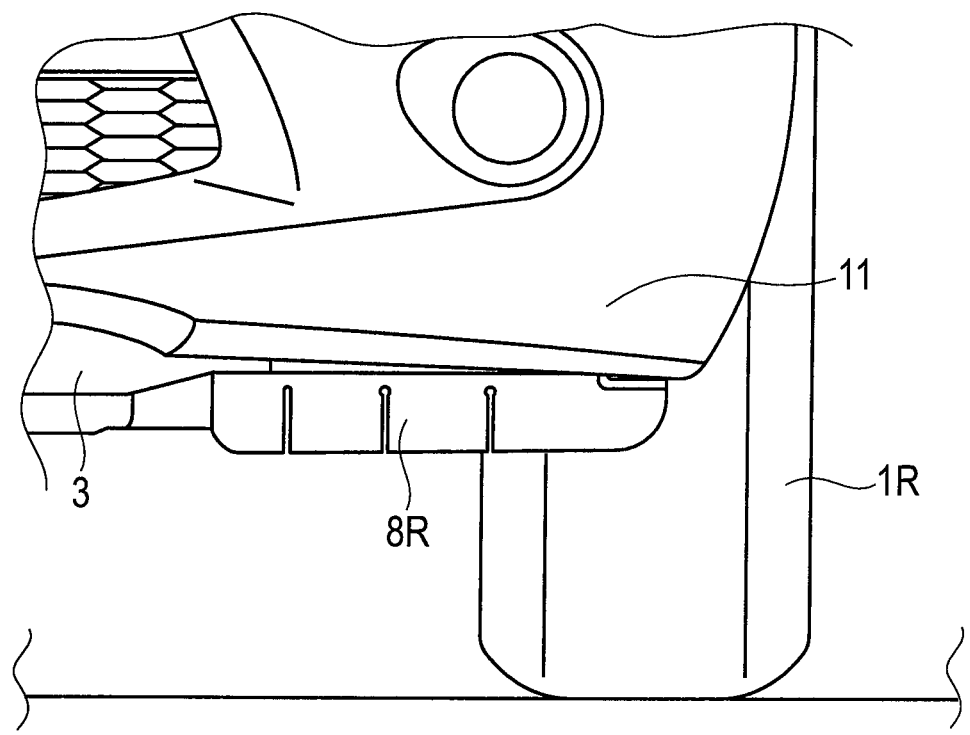
FIG. 3 is a front elevation viewed in the direction of arrow A of FIG. 2, showing a front left tire portion of the electric vehicle to which the front underfloor structure of the embodiment 1 is applied.

FIGS. 2 and 3 are views showing the front underfloor structure of the embodiment 1. The front underfloor structure will be described below with reference to FIGS. 2 and 3.

As shown in FIGS. 2 and 3, the front underfloor structure of the electric vehicle EV of the embodiment 1 includes the pair of left and right front tires 1L, 1R, the front undercover 3, the pair of left and right front deflectors 8L, 8R, the pair of left and right front suspension links 10L, 10R, the front bumper fascia 11, the front suspension member 12, a pair of left and right front wheel houses 14L, 14R, a fender protector 15, and a front side members 16L, 16R.

The pair of left and right front tires 1L, 1R, the pair of left and right front suspension links 10L, 10R, and the pair of left and right front wheel houses 14L, 14R are set at the left and right, respectively, of the front underfloor of the electric vehicle EV. The pair of left and right front tires 1L, 1R are turnably and resiliently mounted by the front suspension links 10L, 10R, respectively, supported by the front suspension member 12. Then, the pair of left and right front tires 1L, 1R are accommodated in the pair of left and right front wheel houses 14L, 14R, respectively, to thus ensure moving space that permits turning motion of the front tires 1L, 1R involved in steering, up-and-down motion involved in bounding and rebounding, and the like.

The front undercover 3 that covers a region of the front underfloor, exclusive of the pair of left and right front deflectors 8L, 8R, the pair of left and right front tires 1L, 1R, the pair of left and right front wheel houses 14L, 14R, and the pair of left and right front suspension links 10L, 10R, is attached to a central portion of the front underfloor of the electric vehicle EV in the vehicle width direction. The front undercover 3 has the protruding portion with curved surface 31, which is disposed at a position closer to the vehicle front than the pair of left and right front deflectors 8L, 8R and has a longer dimension in the vehicle width direction than a dimension in the vehicle longitudinal direction. The protruding portion with curved surface 31 has the flow redirection function of controlling a velocity of flow of traveling air that flows in from the vehicle front, thereby to suppress a divergent flow of the traveling air in the vehicle width direction and thus bring the traveling air into convergence in a region below the central portion of the front underfloor centered on the vehicle center line CL.

As shown in FIGS. 2 and 3, the front underfloor of the electric vehicle EV is provided with the pair of left and right front deflectors 8L, 8R as flow redirection plate members, which are disposed forward of the pair of left and right front tires 1L, 1R, respectively, protruding downward from a bottom surface of the front underfloor. When struck by air traveling from the vehicle front while traveling, the pair of left and right front deflectors 8L, 8R cause a flow of the traveling air to branch into two flows, redirect one of the branched flows inward in the vehicle to form a flow inward in the vehicle, and redirect the other flow outward in the vehicle to form a flow outward in the vehicle. The flow of air that flows inward in the vehicle is bypassed around the insides of the pair of left and right front tires 1L, 1R, the pair of left and right front suspension links 10L, 10R, and the pair of left and right front wheel houses 14L, 14R, which are set at the left and right, respectively, of the front underfloor. Also, the flow of air that flows outward in the vehicle is bypassed around the outsides of the pair of left and right front tires 1L, 1R and the pair of left and right front wheel houses 14L, 14R, which are set at the left and right, respectively, of the front underfloor.

FIGS. 4 to 8 are views showing a configuration of the front deflector in the front underfloor structure of the embodiment 1. The configuration of the front deflector will be described below with reference to FIGS. 4 to 8.

Figure 4:
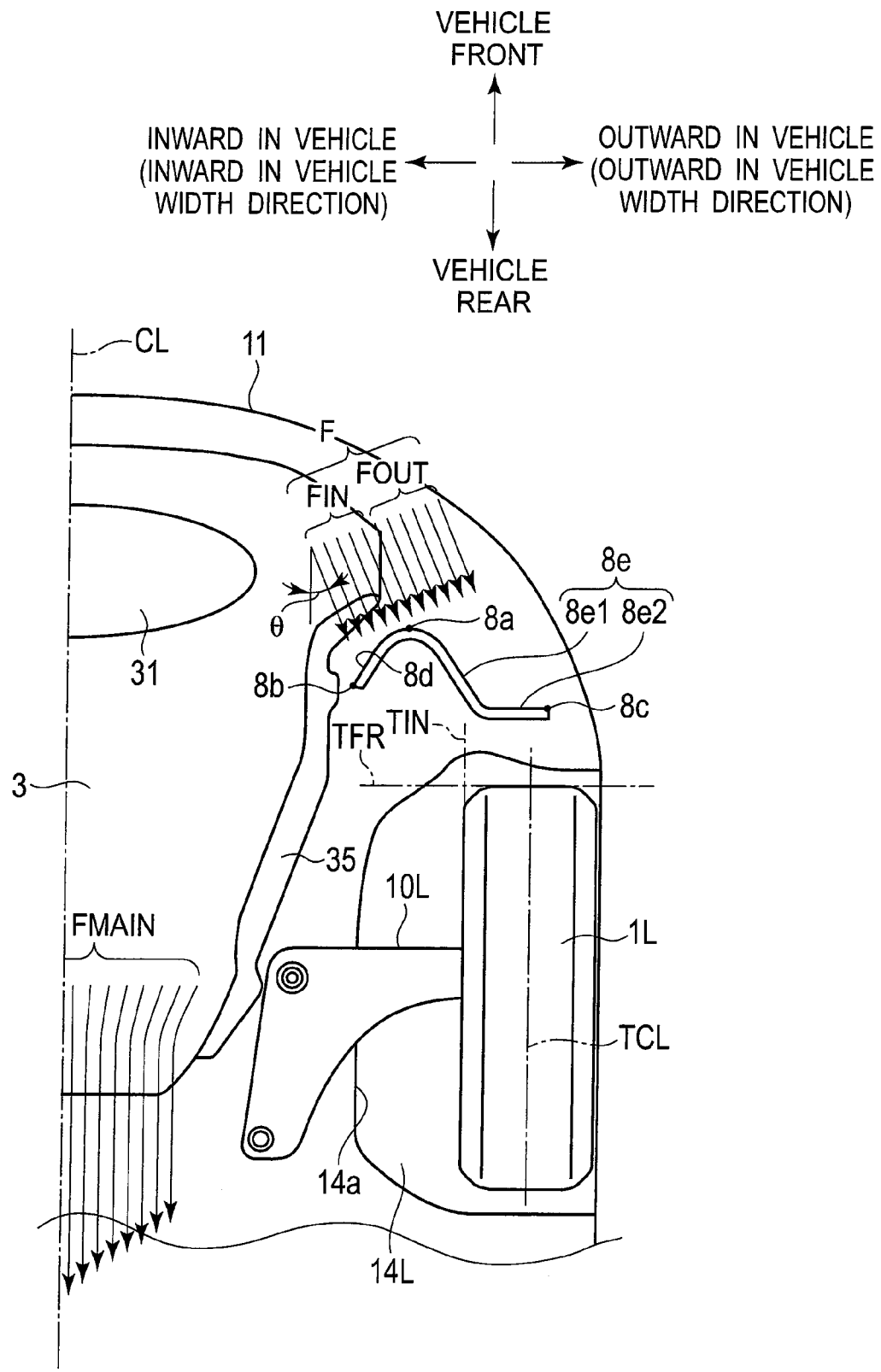
FIG. 4 is a view of assistance in explaining the relative position of a front deflector in the front underfloor structure of the embodiment 1.

As shown in FIG. 4, each of the pair of left and right front deflectors 8L, 8R includes a front apex portion 8a, an inner end portion 8b, an outer end portion 8c, a first flow redirection surface 8d, a second flow redirection surface 8e (flow redirection surface). Incidentally, the front deflectors 8L, 8R each have a shape symmetric with respect to the vehicle center line CL, and therefore, hereinbelow, description will be given with regard to the configuration of the front deflector 8L, and description of the front deflector 8R will be omitted.

As shown in FIG. 4, the front apex portion 8a is disposed on the front underfloor of the vehicle such that that the front apex portion 8a is located at a position closer to the vehicle front than the position of a leading edge surface TFR of the front tire 1L when straight (or a front edge surface of the front tire in its straight traveling position in the vehicle longitudinal direction) and also is located inward in the vehicle width direction, closer to the vehicle center line CL relative to the position of an inner surface TIN of the front tire when straight (or an inside surface of the front tire in its straight traveling position in the vehicle width direction). The position of the front apex portion 8a in the vehicle longitudinal direction and the position of the front apex portion 8a in the vehicle width direction are determined based on a direction of a streamline of traveling air such that traveling air that flows in from the vehicle front in the vehicle longitudinal direction flows toward the vehicle rear, diverging in the vehicle width direction. In other words, the position of the front apex portion 8a in the vehicle longitudinal direction and the position of the front apex portion 8a in the vehicle width direction are determined so that the front apex portion 8a branches a tire streamline flux F of traveling air having a divergent angle θ, which flows in toward the front tire 1L, into a vehicle inside streamline flux FIN and a vehicle outside streamline flux FOUT. Incidentally, the divergent angle θ refers to the angle formed by the vehicle longitudinal direction and a direction of the tire streamline flux F in the bottom view of the vehicle. The divergent angle θ has values varying according to the velocity of flow of traveling air, in such a manner that the divergent angle θ is small when the velocity of flow of traveling air is low, while the divergent angle θ becomes larger as the velocity of flow of traveling air becomes higher. Therefore, positioning of the front apex portion 8a is accomplished by performing experiments or the like to determine a traveling air flow velocity region having the great effect of reducing running resistance, and positioning the front apex portion 8a based on the divergent angle θ in the determined traveling air flow velocity region.

As shown in FIG. 4, the inner end portion 8b is disposed at a position closer to the vehicle rear than the front apex portion 8a and inward of the front apex portion 8a in the vehicle width direction. The position of the inner end portion 8b in the vehicle width direction is substantially coincident with the position of an inside surface 14a of the front wheel house 14L in the vehicle width direction.

As shown in FIG. 4, the outer end portion 8c is disposed at a position closer to the vehicle rear than the front apex portion 8a and outward of in the vehicle width direction relative to the front apex portion 8a. The position of the outer end portion 8c in the vehicle longitudinal direction is such that the outer end portion 8c is located slightly toward the vehicle rear relative to the inner end portion 8b. The position of the outer end portion 8c in the vehicle width direction is such that the outer end portion 8c is located outward of a tire central axis TCL of the front tire 1L when straight (or a width center line of the front tire in its straight traveling position).

As shown in FIG. 4, the first flow redirection surface 8d connects the front apex portion 8a and the inner end portion 8b, and is configured such that, when struck by air traveling from the vehicle front, the first flow redirection surface 8d redirects a flow of the traveling air inward in the vehicle to form a flow inward in the vehicle. The first flow redirection surface 8d is configured as a deflection surface having an angle of inclination such that the deflection surface is inclined inward in the vehicle (or the deflection surface is inclined inward in the vehicle toward the vehicle rear), thereby to redirect the vehicle inside streamline flux FIN of traveling air branched by the front apex portion 8a, to a main streamline flux FMAIN of traveling air passing below the central portion of the front underfloor centered on the vehicle center line CL.

As shown in FIG. 4, the second flow redirection surface 8e connects the front apex portion 8a and the outer end portion 8c, and is configured such that, when struck by air traveling from the vehicle front, the second flow redirection surface 8e redirects a flow of the traveling air outward in the vehicle to form a flow outward in the vehicle. The second flow redirection surface 8e has a curved flow redirection surface 8e1 configured as a deflection surface having an angle of inclination such that the deflection surface is inclined obliquely rearward and outward in the vehicle (or the deflection surface is inclined outward in the vehicle toward the vehicle rear), and a flat flow redirection surface 8e2 configured as a deflection surface having an angle of inclination such that the deflection surface is inclined laterally outward in the vehicle (or the deflection surface is inclined outward in the vehicle at a larger angle of inclination than that of the curved flow redirection surface 8e1). The curved flow redirection surface 8e1 gradually redirects, obliquely outward, the vehicle outside streamline flux FOUT of traveling air branched by the front apex portion 8a to form an obliquely outward flow. The flat flow redirection surface 8e2 redirects the obliquely outward flow of air from the curved flow redirection surface 8e1, further outward in the vehicle width direction to form a flow outward in the vehicle width direction.

Figure 5:
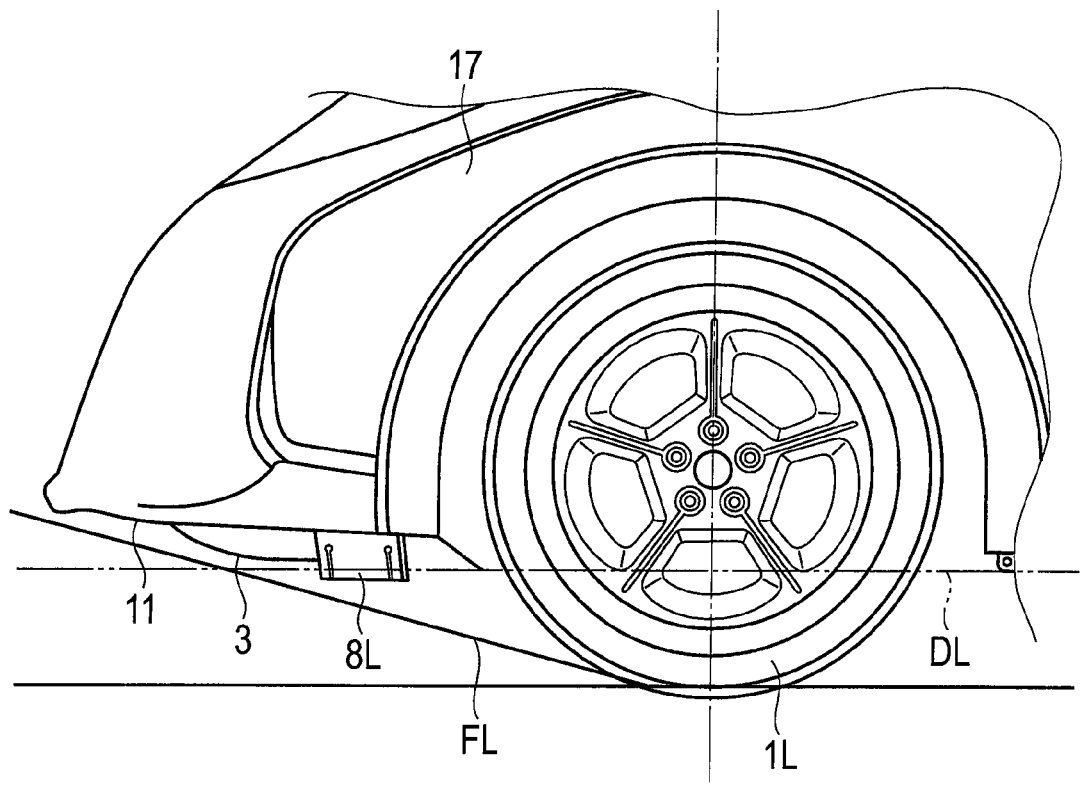
FIG. 5 is a side view showing the front left tire portion of the electric vehicle to which the front underfloor structure of the embodiment 1 is applied.

As shown in FIG. 5, a height of a protrusion of the front deflector 8L from the bottom surface of the front underfloor is set lower than a front inclined line FL and higher than a door portion horizontal line DL. As employed herein, the front inclined line FL refers to the line that connects the position of contact of the front tire 1L and the position of a lower end of the front bumper fascia 11. The door portion horizontal line DL refers to the line that connects lower ends of a front fender 17 in a horizontal direction. In other words, the height of the protrusion of the front deflector 8L from the bottom surface of the front underfloor is set so that a height that permits preventing interference with a road surface is set as an upper limit height (i.e. the front inclined line FL), and a height that permits fully achieving the flow redirection function while traveling is set as a lower limit height (i.e. the door portion horizontal line DL).

Figure 6:
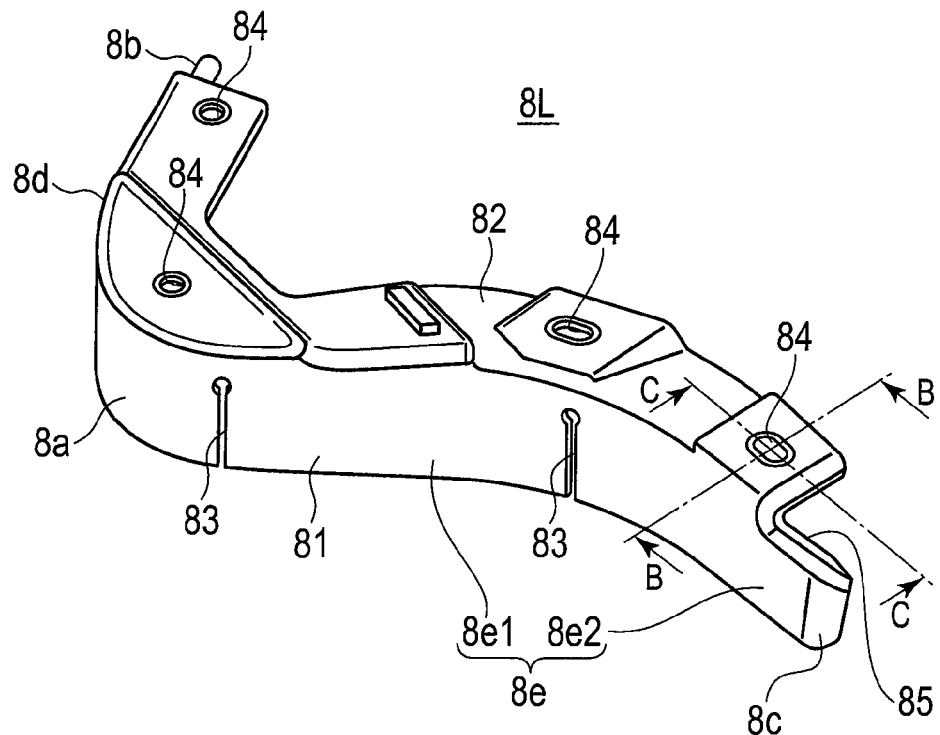
FIG. 6 is a perspective view showing the front deflector in the front underfloor structure of the embodiment 1.

As shown in FIG. 6, a specific configuration of the front deflector 8L includes integrally a deflector body portion 81 having the first flow redirection surface 8d and the second flow redirection surface 8e, and a mounting flange portion 82 for mounting the deflector body portion 81 to the fender protector 15. The front deflector 8L is manufactured by using a flexible material such as polypropylene containing rubber. Also, the deflector body portion 81 is provided with plural slits 83 (e.g. three in the embodiment 1) in a direction of from top to bottom of the vehicle. The flexible material and the slits 83 prevent impairment of the flow redirection function even if the front deflector 8L is subjected to a deformation force, in such a manner that the front deflector 8L is easily deformed by stone or the like and, after deformation, is immediately restored to its original shape by a restoring force. The mounting flange portion 82 is provided with plural J-bolt holes 84 (e.g. four in the embodiment 1). Then, the second flow redirection surface 8e is provided at its end portion side with an overhang notch groove 85 in order that the second flow redirection surface 8e is mounted extending over the flange portion 11a of the front bumper fascia 11.

Figure 7:
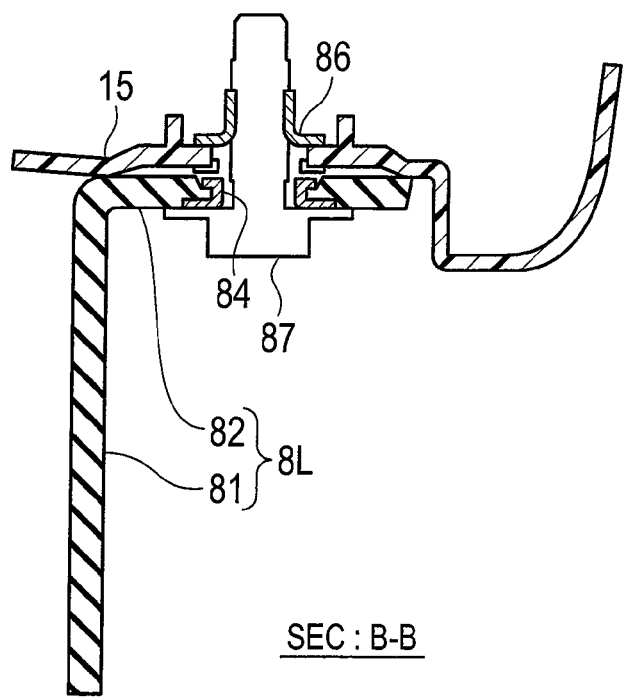
FIG. 7 is an end view in section taken along line B-B of FIG. 6, showing a mounting structure for the front deflector in the front underfloor structure of the embodiment 1.
Figure 8:
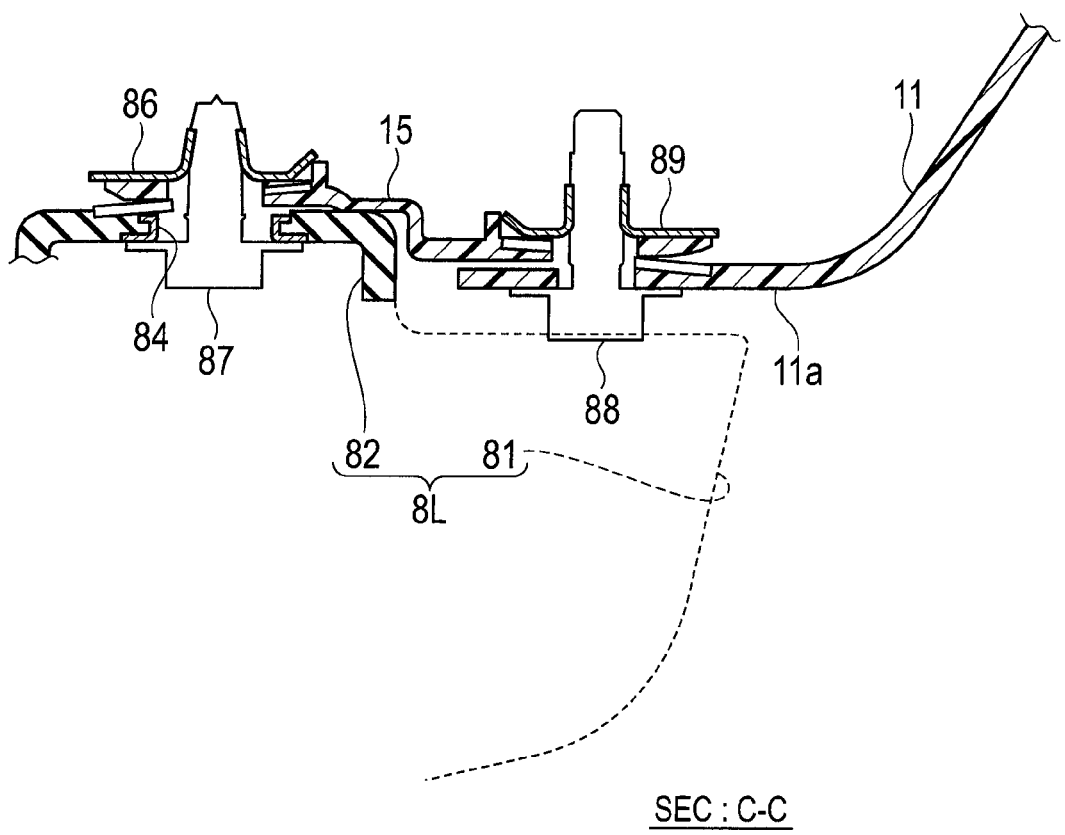
FIG. 8 is an end view in section taken along line C-C of FIG. 6, showing the mounting structure for the front deflector in the front underfloor structure of the embodiment 1.

As shown in FIG. 7, the mounting of the front deflector 8L is accomplished by providing the fender protector 15 with a J-nut 86 beforehand, and screwing J-bolts 87 from the outside into the J-bolt holes 84. As shown in FIG. 8, the mounting of the second flow redirection surface 8e at its end portion side is accomplished by fixing the fender protector 15 to the flange portion 11a of the front bumper fascia 11 by a J-bolt 88 and a J-nut 89, and screwing the J-bolts 87 from the outside into the J-bolt holes 84 with the second flow redirection surface 8e extending over the flange portion 11a through the overhang notch groove 85.

Figure 9:
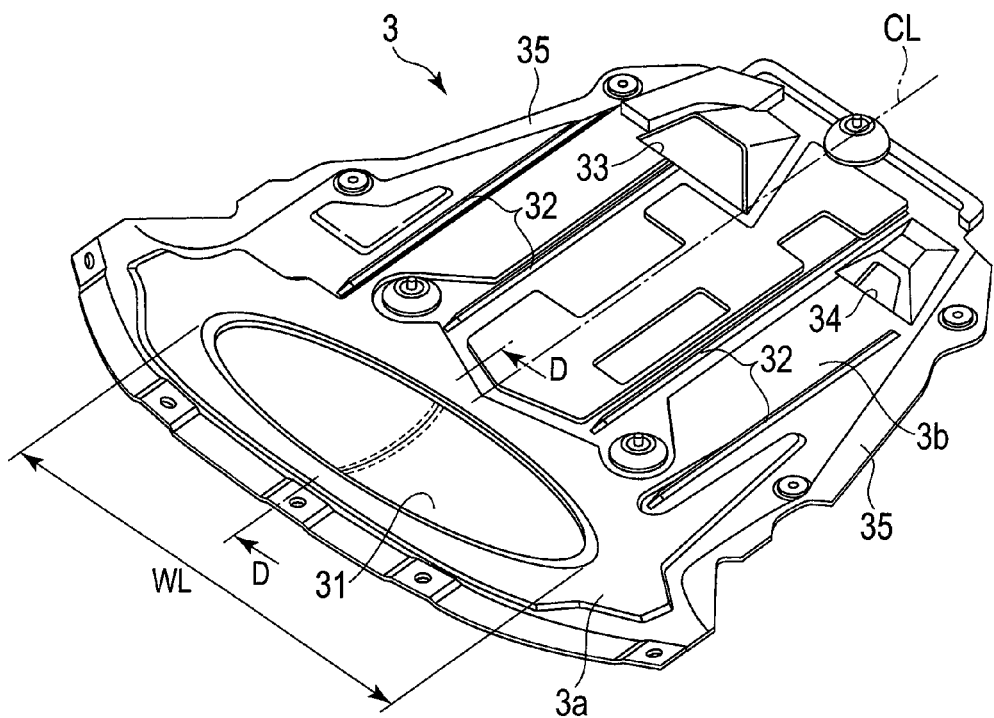
FIG. 9 is a perspective view showing a front undercover in the front underfloor structure of the embodiment 1.
Figure 10:
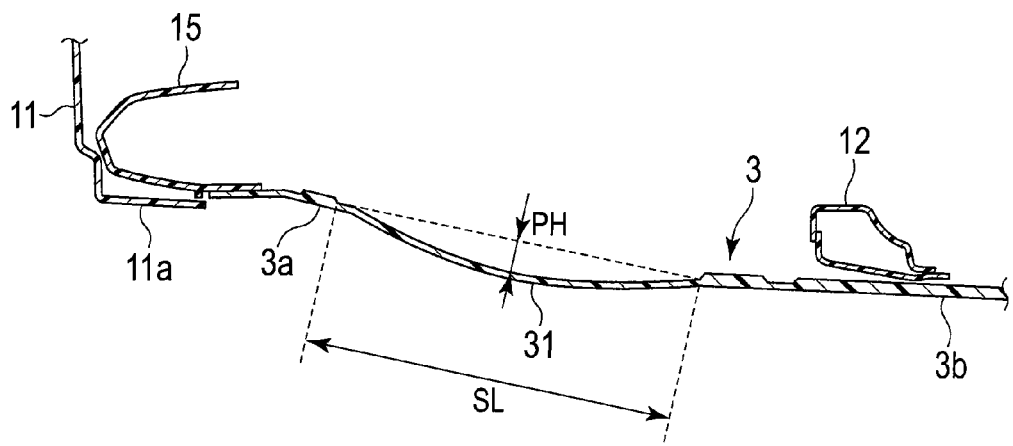
FIG. 10 is an end view in section taken along line D-D of FIG. 9, showing a protruding portion with curved surface of the front undercover in the front underfloor structure of the embodiment 1.

FIGS. 9 and 10 are views showing the front undercover in the front underfloor structure of the embodiment 1. A configuration of the front undercover will be described below with reference to FIGS. 9 and 10.

As shown in FIG. 9, the front undercover 3 is a resin coated plate having a trapezoidal shape in such a way as to cover the entire region of the front underfloor, exclusive of the regions of the pair of left and right front tires 1L, 1R. As shown in FIG. 10, the front undercover 3 is fixed to the fender protector 15 by J-bolts (unillustrated). The front undercover 3 has the protruding portion with curved surface 31 protruding downward below a main surface of the front undercover 3, which is located at a position closer to the vehicle front than the pair of left and right front deflectors 8L, 8R. The protruding portion with curved surface 31 has the rugby ball shape such that a dimension WL in the vehicle width direction is longer than a dimension SL in the longitudinal direction, and its surface is in the form of a smooth curved surface. The protruding portion with curved surface 31 has a circumference of protrusion in the vehicle longitudinal direction (or a circumference of a surface of the protruding portion with curved surface 31 at its position in the vehicle width direction, across its end toward the vehicle front and its end toward the vehicle rear) that is longest at the position of the vehicle center line CL, and the circumference of protrusion in the vehicle longitudinal direction becomes gradually shorter with increasing distance from the vehicle center line CL on both sides in the vehicle width direction. In other words, the protruding portion with curved surface 31 is configured as follows. As shown in FIG. 10, a protrusion height PH is set highest at the position of the vehicle center line CL, and thus, the velocity of flow of traveling air is set highest at the position of the vehicle center line CL. Then, the velocity of flow of traveling air becomes gradually lower with increasing distance from the vehicle center line CL on both sides in the vehicle width direction.

Next, operation will be described.

Firstly, description will be given "regarding air drag on the vehicle." Then, operation of the front underfloor structure of the electric vehicle EV of the embodiment 1 will be described in sections "operation for improving aerodynamic characteristics by the underfloor and the entire tires," "operation for reducing air drag on the front underfloor and the front tires by the front deflectors," and "operation for reducing air drag by a combination."

[Regarding Air Drag on the Vehicle]

Air drag D (N) on the vehicle is defined as Equation (1):

$$D = CD \times \tfrac{1}{2} \times \rho \times \mu^2 \times A \qquad (1)$$

where CD denotes a drag coefficient (which is a dimensionless number); $\rho$, air density (kg/m$^3$); $\mu$, relative velocity of air and the vehicle (m/sec); and A, a frontal projected area (m$^2$).

As is apparent from Equation (1), the air drag D has a value that is proportional to the drag coefficient CD (which is an abbreviation of Constant Drag) and is proportional to a square of the relative velocity u of the air and the vehicle (which is equal to the velocity of flow of traveling air, or is equal to a travel speed of the vehicle, for example when no flow of air takes place).

To reduce the air drag D, a series of processes is to see the followings:

(a) by what amount of deviation the drag coefficient CD deviates from a target;

(b) where a cause of deviation from the target lies in; and (c) to what extent the target is approached by eliminating the cause.

Of these, (a) and (c) can be obtained from the drag coefficient CD calculated accurately by computational fluid dynamics; however, accurate determination of (b) is difficult with only velocity or pressure calculated by computational fluid dynamics.

Figure 11:
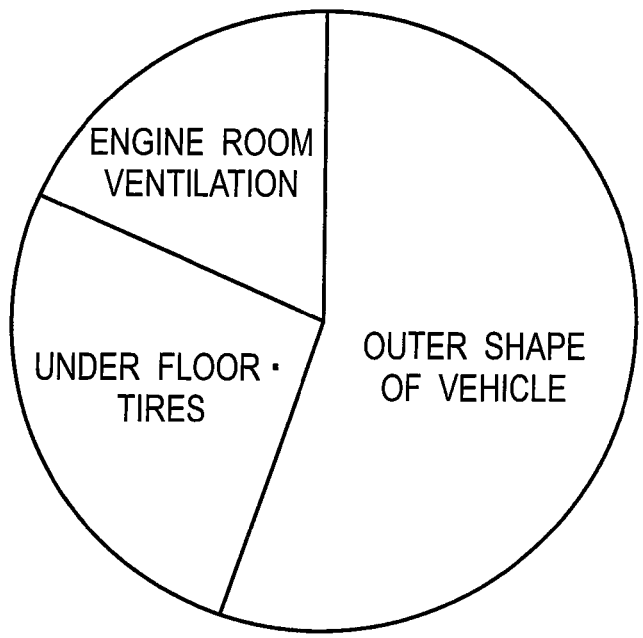
FIG. 11 is a circle graph showing classification of sources of air drag on typical passenger cars (e.g. engine driven cars).

As for the air drag D, FIG. 11 shows classification of sources of air drag on typical passenger cars (e.g. engine driven cars). As is apparent from FIG. 11, an outer shape of the vehicle forms the largest proportion of the sources of drag. However, the underfloor and the tires form the second largest proportion of the sources of drag, which exceeds the proportion of air drag caused by engine room ventilation. In other words, it cannot be said with assurance that the air drag D depends only on styling of the vehicle's outer shape, and it can be seen that consideration is necessary for the sources of drag including the underfloor and tires and the engine room ventilation.

Meanwhile, improvements in aerodynamic characteristics for a reduction in the air drag D have been made focusing mainly on the styling of the vehicle's outer shape. However, in the case of, for example, a vehicle that needs to ensure ride comfort in its rear seats, improvements in aerodynamic characteristics, even if made by the styling of the vehicle's outer shape, have their own limitations because of restrictions on design, that is, a need to ensure cabin space in the rear seats. In other words, when desired aerodynamic characteristics are set to high level for purposes of extension of cruising range, improvements made only by the styling of the vehicle's outer shape cannot be expected to achieve improvements such that the desired aerodynamic characteristics are reached.

It may also be said that how long the cruising range is extended by a given capacity of a fully charged battery is a lifeline, particularly for an electric vehicle having the battery mounted in limited space on the underfloor. In the electric vehicle, when improvements in aerodynamic characteristics made by the styling of the vehicle's outer shape are at their limits, minimization of air drag caused by the underfloor and the entire tires leads to a reduction in air drag on the electric vehicle as a whole and the extension of the cruising range, which is a vital technical issue. Then, in order to achieve an effective reduction in the air drag on the underfloor and the entire tires, suppression of a turbulent flow produced by the front underfloor and the front tires that are present in a region where a flow of traveling air starts flowing in is important in achieving the reduction in the air drag caused by the underfloor and the entire tires.

[Operation for Improving Aerodynamic Characteristics by the Underfloor and the Entire Tires]

As described above, in the electric vehicle, the minimization of the air drag caused by the underfloor and the entire tires is important in extending the cruising range. Description will be given below with regard to the operation for improving aerodynamic characteristics by the underfloor and the entire tires in the electric vehicle EV of the embodiment 1, reflecting the above.

In the electric vehicle EV, as shown in FIG. 1, the undercovers 3, 4, 5, 6, 7 cover substantially the entire region of the underfloor, exclusive of the tires and so on. This ensures an even, continuous, smooth surface extending from a front end of the vehicle to a rear end of the vehicle, and a flow of traveling air that flows in from the vehicle front forms the main streamline flux FMAIN passing below an underfloor central region centered on the vehicle center line CL. Thus, the flow of the traveling air that flows in from the vehicle front flows past the undercovers 3, 4, 5, 6, 7 and smoothly escapes to the vehicle rear. The rear undercover 7 that covers the rear underfloor, in particular, has the diffuser structure and thus adds an operation for promoting the escape of the flow of the traveling air to the vehicle rear. In this manner, the flow of the traveling air smoothly flows in an orderly line below the underfloor central region extending from the front end of the vehicle to the rear end of the vehicle, so that the air drag D is reduced in the underfloor central region.

In the electric vehicle EV, as shown in FIG. 1, the pair of left and right front deflectors 8L, 8R are disposed forward of the pair of left and right front tires 1L, 1R, respectively. Thereby, a flow of traveling air that flows around the front tires 1L, 1R while traveling is redirected so as to suppress the flow of the traveling air into the regions of the front tires 1L, 1R. As a result, the air drag D is reduced in the regions of the front tires 1L, 1R by suppression of the flow of the traveling air into the regions of the front tires 1L, 1R where an increase in the air drag is mainly caused.

In the electric vehicle EV, as shown in FIG. 1, the pair of left and right rear deflectors 9L, 9R are disposed forward of the pair of left and right rear tires 2L, 2R, respectively. Thereby, a flow of traveling air while traveling is redirected so as to be bypassed around the rear tires 2L, 2R. As a result, the air drag D is reduced in the regions of the rear tires 2L, 2R by the flow of the traveling air being bypassed around the rear tires 2L, 2R.

In the electric vehicle EV, as shown in FIG. 1, the front undercover 3 is provided with the protruding portion with curved surface 31 for controlling the velocity of flow of traveling air. This suppresses a divergent flow of traveling air that flows in from the vehicle front while traveling, thereby to form the main streamline flux FMAIN passing below the central portion of the front underfloor centered on the vehicle center line CL. As a result, the traveling air that flows in from the front end of the vehicle is brought into convergence in the central region of the front underfloor, so that the air drag D is reduced in the central region of the front underfloor.

As described above, the electric vehicle EV of the embodiment 1 adopts the underfloor structure intended to improve aerodynamic characteristics of the underfloor and the entire tires. This reduces the air drag D on the underfloor and the entire tires of the electric vehicle EV, and thus enables achieving improvements in aerodynamic characteristics as a whole such that the cruising range of the electric vehicle EV is extended.

[Operation for Reducing Air Drag on the Front Underfloor and the Front Tires by the Front Deflectors]

As described above, in the electric vehicle EV, in order to achieve the effective reduction in the air drag on the underfloor and the entire tires, it is important that the turbulent flow produced by the front underfloor and the front tires that are present in the region where a flow of traveling air starts flowing in be suppressed to achieve the reduction in the air drag. Description will be given below with regard to the operation for reducing air drag on the front underfloor and the front tires by the front deflectors 8L, 8R in the electric vehicle EV of the embodiment 1, reflecting the above.

Figure 12:
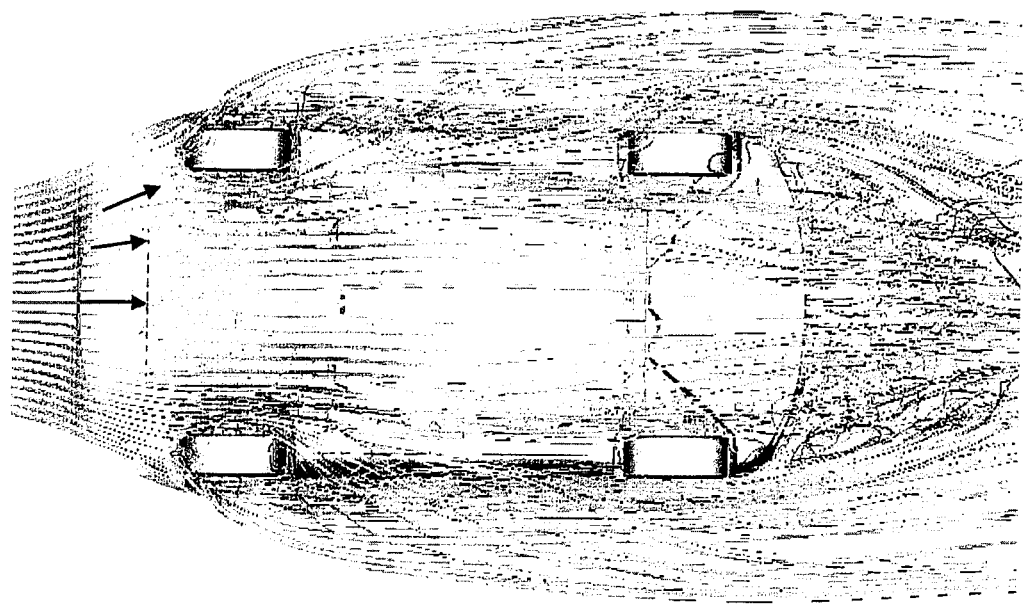
FIG. 12 is a representation of flow of traveling air, showing a flow of traveling air that flows around a front underfloor and front tires in an electric vehicle of a comparative example.

Firstly, FIG. 12 shows results of analytical tests which the inventors have performed on a flow of traveling air that flows around the front underfloor and the front tires of the electric vehicle. Analyses of the cause and mechanism of air drag in the front underfloor region of the vehicle, based on the test results, have showed that, when the front deflectors 8L, 8R is used for flow redirection, consideration is necessary for two points given below.

(A) When a flow of traveling air strikes the front tires 1L, 1R or the front suspension links 10L, 10R, collision of the flow of traveling air produces high air drag, and further, when the tires rotate with steering, the flow of traveling air is stirred and thus produces higher air drag. Also, when the flow of traveling air is drawn into the front wheel houses 14L, 14R, the front wheel houses 14L, 14R are filled with the air to thus produce a vortex structure (e.g. a vortex tube or a vortex layer), and the vortex structure grows into high air drag. In other words, it has been shown that the regions of the front tires 1L, 1R (i.e. the front tires 1L, 1R and their peripheral regions (i.e. the front suspension links 10L, 10R, the front wheel houses 14L, 14R, etc.)) which the flow of traveling air strikes or into which the flow of traveling air is drawn are locations where the increase in the air drag is mainly caused.

(B) Focusing on a streamline of air introduced from the vehicle front, traveling toward the pair of left and right front tires 1L, 1R, it can be seen that a phenomenon similar to a back rush takes place; for example, when a ship is moving, the bottom of the ship pushes aside water, and thus, the back rush occurs. In other words, it has been shown that, while the vehicle is traveling, the front underfloor pushes aside surrounding air, and thus, a streamline having a divergent angle diverging in the vehicle width direction toward the vehicle rear is drawn as shown by arrows of FIG. 12.

Figure 13:
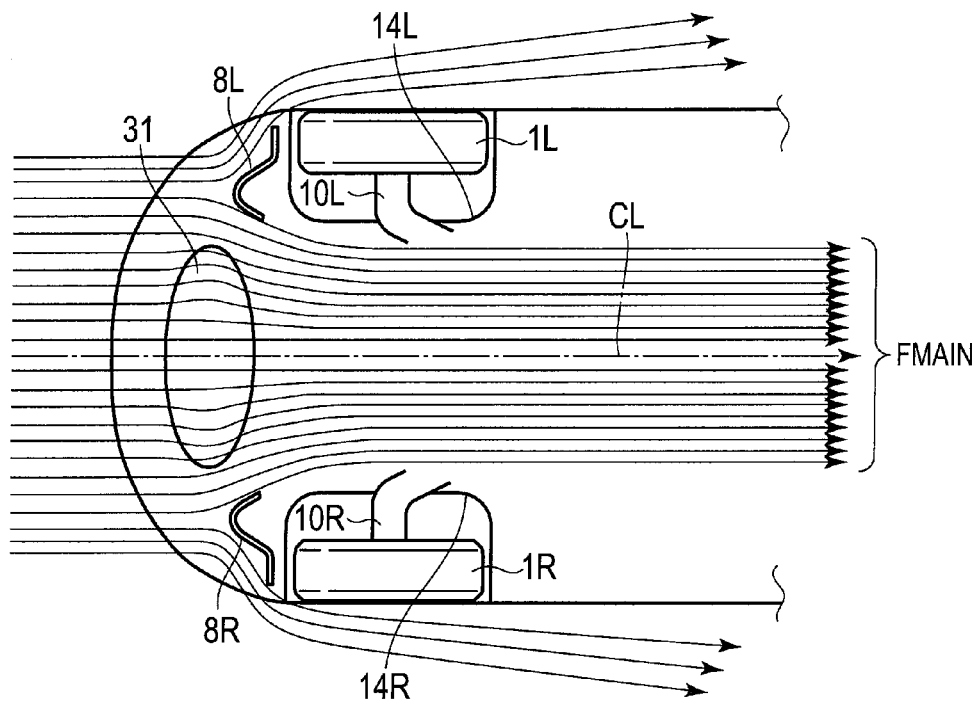
FIG. 13 is a view of streamline of traveling air, showing a flow of traveling air that flows around the front underfloor and the front tires in the electric vehicle to which the front underfloor structure of the embodiment 1 is applied.
Figure 14:
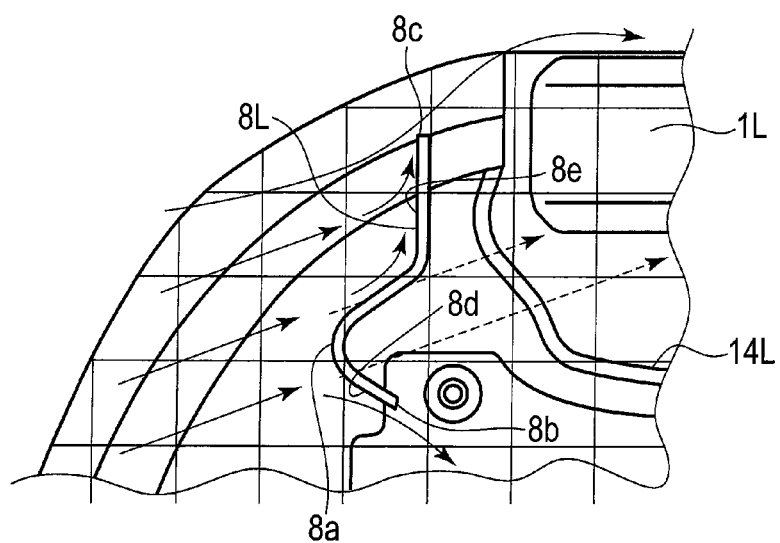
FIG. 14 is a view of streamline of traveling air, showing a flow of traveling air that flows around the front left tire in the electric vehicle to which the front underfloor structure of the embodiment 1 is applied.

Meanwhile, in the embodiment 1, the front apex portions 8a of the pair of left and right front deflectors 8L, 8R are disposed at the position closer to the vehicle center line CL which is inward in the vehicle width direction of the positions of the inner surfaces TIN of the front tires 1L, 1R when straight, taking into account a streamline of traveling air diverging in the vehicle width direction. Thus, as shown in FIGS. 13 and 14, when a flow of traveling air that flows toward the vehicle rear, diverging in the vehicle width direction, reaches the front apex portions 8a of the pair of left and right front deflectors 8L, 8R, the flow of traveling air branches off from the front apex portions 8a into flows in two directions, which are directed inward in the vehicle and outward in the vehicle, respectively. The flow of traveling air branched inward in the vehicle is redirected by the first flow redirection surfaces 8d and is bypassed around the inner periphery sides of the pair of left and right front tires 1L, 1R. Meanwhile, the flow of traveling air branched outward in the vehicle is redirected by the second flow redirection surfaces 8e and is bypassed around the outer periphery sides of the pair of left and right front tires 1L, 1R.

In other words, the first flow redirection surface 8d serves the flow redirection function for deflecting a divergent flow of traveling air in the vehicle width direction to an inward convergent flow of traveling air, and thereby directing the flow of traveling air back to the front underfloor. Meanwhile, the second flow redirection surface 8e serves the flow redirection function for deflecting a divergent flow of traveling air in the vehicle width direction to a more divergent flow of traveling air in the vehicle width direction, and thereby releasing the flow of traveling air to the outside of the vehicle (the outward in the vehicle width direction).

The pair of left and right front deflectors 8L, 8R serve the flow redirection function for bypassing flows of traveling air around the inner and outer peripheries of the pair of left and right front tires 1L, 1R, thereby to reduce the rate of flow of traveling air into the front tire regions where air drag is mainly caused. In other words, as shown in FIG. 13, a streamline that avoids the flow of traveling air into the regions of the front tires 1L, 1R is formed as a streamline of a flow downstream of the front deflectors 8L, 8R, thereby to suppress the occurrence of a turbulent flow in the regions of the front tires 1L, 1R.

It has been observed that, for example when a turbulent flow occurs in the front tire region, a vortex structure (a vortex tube and a vortex layer) is present on a very small scale in the turbulent flow, and the frequency of occurrence of the process of formation of the vortex tube from the vortex layer (or the process of transition from the vortex layer to the vortex tube) is increased. Then, it is known that a small-scale vortex structure is formed and the turbulent flow grows to thus increase the air drag D. Therefore, the suppression of occurrence of a turbulent flow in the front tire regions leads directly to a reduction in the air drag D.

As described above, in the electric vehicle EV of the embodiment 1, the front apex portions 8a of the pair of left and right front deflectors 8L, 8R are located so as to branch a flow of traveling air that flows in from the vehicle front and diverges in the vehicle width direction, into flows in two directions, which are directed inward in the vehicle and outward in the vehicle, respectively. Thus, a turbulent flow produced by the front underfloor and the front tires that are present in the region where a flow of traveling air starts flowing in, while traveling, is suppressed, so that a reduction in the air drag D can be achieved.

[Operation for Reducing Air Drag by a Combination]

For a reduction in the air drag D caused by the front underfloor and the front tires, it is important that the flow of traveling air branched inward in the vehicle by the front deflectors be kept in an inward direction until the flow of traveling air passes through the front tire regions. Description will be given below with regard to the operation for reducing air drag by a combination of the protruding portion with curved surface 31 and the front deflectors 8L, 8R in the embodiment 1, reflecting the above.

The front apex portions 8a of the pair of left and right front deflectors 8L, 8R branch a flow of traveling air that flows in from the vehicle front, in the inward direction. Then, the first flow redirection surfaces 8d redirect the vehicle inside streamline flux FIN of traveling air branched, to the main streamline flux FMAIN of traveling air passing below the central portion of the front underfloor centered on the vehicle center line CL. At this time, for example, when the flow of traveling air directed toward the main streamline flux FMAIN of traveling air is subjected to drag by being pressed from the main streamline flux FMAIN side, the flow of traveling air flows back to the insides of the front tires 1L, 1R and into the front wheel houses 14L, 14R.

Meanwhile, the front undercover 3 that covers the front underfloor has the protruding portion with curved surface 31 in which the dimension WL in the vehicle width direction is longer than the dimension SL in the longitudinal direction, which is disposed at the position closer to the vehicle front than the pair of left and right front deflectors 8L, 8R. Then, the protruding portion with curved surface 31 has the circumference of protrusion in the vehicle longitudinal direction that is set longest at the position of the vehicle center line CL, and the circumference of protrusion in the vehicle longitudinal direction is set gradually shorter with increasing distance from the vehicle center line CL on both sides in the vehicle width direction.

Thus, a flow of traveling air has the highest flow velocity and the lowest pressure at the position of the vehicle center line CL, and the flow of traveling air becomes gradually lower in its flow velocity and also gradually higher in its pressure with increasing distance from the vehicle center line CL on both sides in the vehicle width direction. By this differential pressure, a streamline of traveling air that flows in from the vehicle front, flowing at a position far away from the vehicle center line CL and having high pressure, is deflected toward the vehicle center line CL at which the pressure is low. This deflection suppresses a divergent flow of traveling air that flows in from the vehicle front, in the vehicle width direction.

In other words, the protruding portion with curved surface 31 serves the flow redirection function of suppressing a divergent flow of traveling air that flows in from the vehicle front, thereby bringing the traveling air into convergence to form a flow of traveling air passing below the central portion of the front underfloor centered on the vehicle center line CL, and thereby forming the main streamline flux FMAIN of traveling air (see FIG. 13).

By the flow redirection function of the first flow redirection surfaces 8d, therefore, the flow of traveling air directed toward the main streamline flux FMAIN of traveling air passing below the central portion of the front underfloor centered on the vehicle center line CL joins the main streamline flux FMAIN formed in an orderly line by the protruding portion with curved surface 31. In other words, the flow of traveling air is prevented from flowing back to the insides of the front tires 1L, 1R and into the front wheel houses 14L, 14R.

As described above, in a flow redirection structure of the embodiment 1, a configuration is adopted in which the protruding portion with curved surface 31 formed on the front undercover 3 and the pair of left and right front deflectors 8L, 8R are used in combination. Therefore, a flow of traveling air received by the pair of left and right front deflectors 8L, 8R flows from the first flow redirection surfaces 8d toward the main streamline flux FMAIN and smoothly joins the main streamline flux FMAIN formed in an orderly line by the protruding portion with curved surface 31. Thus, the air drag D caused by the front underfloor and the front tires, while traveling, can be further reduced.

Next, advantageous effects will be described.

The front underfloor structure of the electric vehicle EV of the embodiment 1 can achieve advantageous effects as given below.

(1) There is provided a front underfloor structure of a vehicle (the electric vehicle EV), including front deflectors 8L, 8R disposed forward of front tires 1L, 1R, respectively, in the vehicle and being configured to redirect a flow of traveling air that flows around a front underfloor while traveling, wherein the front deflectors 8L, 8R each include a front apex portion 8a disposed at a position closer to the vehicle front than the position of a leading edge surface TFR of each of the front tires 1L, 1R when straight, and disposed at a position closer to a vehicle center line CL which is inward in a vehicle width direction of the position of an inner surface TIN of each of the front tires 1L, 1R when straight; an outer end portion 8c disposed at a position closer to the vehicle rear than the front apex portion 8a, and disposed at a position outward in the vehicle width direction of the front apex portion 8a; and a second flow redirection surface 8e (a flow redirection surface) connecting the front apex portion 8a and the outer end portion 8c, and being configured such that, when struck by air traveling from the vehicle front, the second flow redirection surface 8e redirects a flow of the traveling air outward in the vehicle to form a flow outward in the vehicle.

This enables reducing the air drag D produced by a flow of traveling air that flows around the front underfloor while traveling, thereby achieving desired improvements in aerodynamic characteristics.

(2) The first flow redirection surface 8d (the flow redirection surface) is such that the position of the front apex portion 8a in a vehicle longitudinal direction and the position of the front apex portion 8a in the vehicle width direction are determined based on a direction of a streamline of traveling air such that a flow of traveling air that flows in from the vehicle front in the vehicle longitudinal direction flows toward the vehicle rear, diverging in the vehicle width direction, in such a manner that the first flow redirection surface 8d is struck by a flow of traveling air having a divergent angle θ, which flows in toward each of the front tires 1L, 1R.

This ensures that the front deflectors 8L, 8R receive the flow of traveling air having the divergent angle θ, thereby achieving the flow redirection function for bypassing the flow of traveling air around the outer periphery sides of the front tires 1L, 1R.

(3) The second flow redirection surface 8e (the flow redirection surface) redirects the flow of traveling air having the divergent angle θ, outward in the vehicle width direction to form a flow outward in the vehicle width direction.

Thus, the second flow redirection surface 8e (the flow redirection surface) redirects the vehicle outside streamline flux FOUT of traveling air branched, outward in the vehicle width direction, thereby to enable reliably forming a flow of traveling air that is bypassed around the outer periphery of each of the front tires 1L, 1R.

(4) The second flow redirection surface 8e (the flow redirection surface) includes a curved flow redirection surface 8e1 configured to gradually redirect the flow of traveling air having the divergent angle θ so that the flow of traveling air becomes an obliquely outward streamline flux, and a flat flow redirection surface 8e2 configured to redirect an obliquely outward flow of air from the curved flow redirection surface 8e1, further outward in the vehicle width direction.

Thus, the second flow redirection surface 8e (the flow redirection surface) performs the flow redirection of releasing the received flow of traveling air (the vehicle outside streamline flux FOUT) outward in the vehicle width direction, while smoothly deflecting the flow of traveling air, thereby to enable suppressing a disturbance in the flow of traveling air flowing along and being deflected by the second flow redirection surface 8e (the flow redirection surface).

(5) The second flow redirection surface 8e (the flow redirection surface) is such that the position of the outer end portion 8c in the vehicle width direction is disposed outward of a tire central axis TCL of each of the front tires 1L, 1R when straight.

Thus, even if the flow of traveling air released outward in the vehicle width direction from the second flow redirection surface 8e (the flow redirection surface) joins a flow of traveling air from the vehicle front and draws a streamline curved toward the vehicle rear, the routing of the flow of traveling air around a shoulder portion of each of the front tires 1L, 1R can be suppressed.

Although the front underfloor structure of the vehicle of the present invention has been described above with reference to the embodiment 1, it is to be understood that a specific configuration is not limited to the embodiment 1, and design changes and additions and the like could be made thereto without departing from the spirit and scope of the invention as defined in the appended claims.

Figure 15:
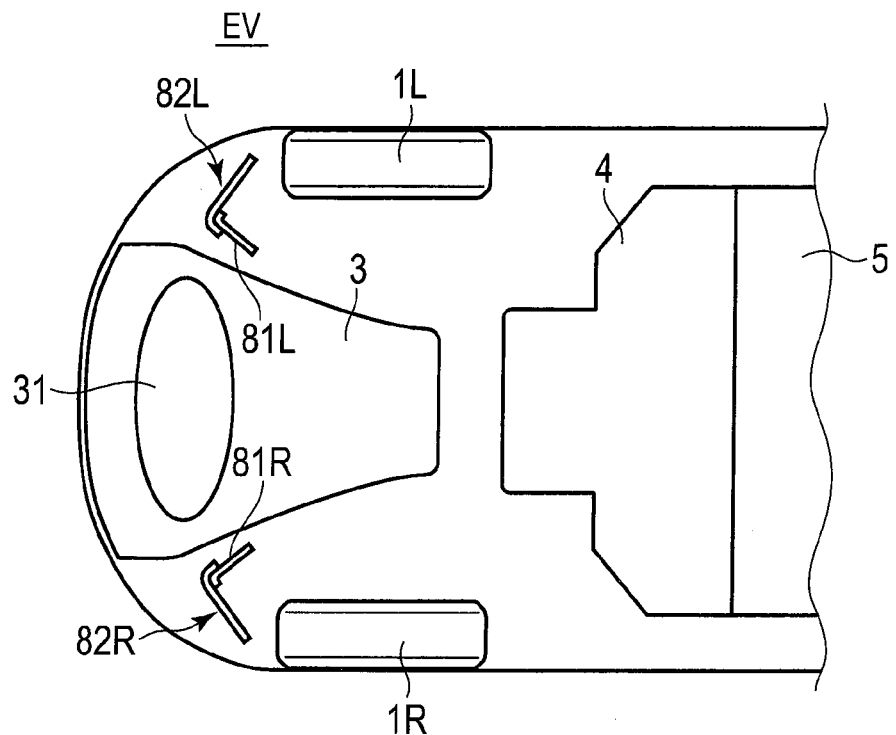
FIG. 15 is a view of assistance in explaining a modification 1 including front deflectors having different shapes from those of the embodiment 1, in the front underfloor structure.
Figure 16:
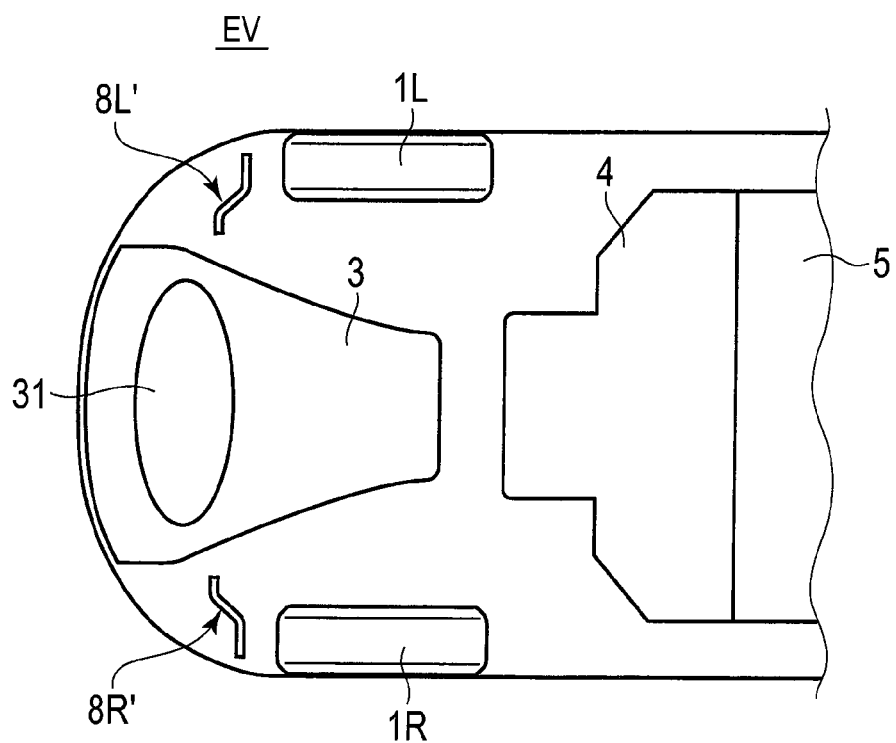
FIG. 16 is a view of assistance in explaining a modification 2 including front deflectors having different shapes from those of the embodiment 1, in the front underfloor structure.

In the embodiment 1, an example is given in which the pair of left and right front deflectors 8L, 8R divide the tire streamline flux F of traveling air having the divergent angle θ substantially into two, and each include the first flow redirection surface 8d and the second flow redirection surface 8e that receive the branched vehicle inside streamline flux FIN and vehicle outside streamline flux FOUT, respectively. However, for example, as shown as a modification 1 in FIG. 15, the front deflectors 8L, 8R of the embodiment 1 may each be divided into two portions to form inner front deflectors 81L, 81R and outer front deflectors 82L, 82R. In this case, the outer front deflectors 82L, 82R correspond to the front deflectors of the present invention. Further, for example, as shown as a modification 2 in FIG. 16, front deflectors 8L', 8R' may be provided and configured to receive almost the entire flow of traveling air that flows toward the front tires, or receive the entire flow of traveling air, and redirect the flow of traveling air outward in the vehicle.

In the embodiment 1, an example is given in which the second flow redirection surface 8e (the flow redirection surface) redirects the vehicle outside streamline flux FOUT of traveling air outward in the vehicle width direction. However, for example, the flow redirection surface may be configured as a deflection surface such that a flow of traveling air received at the divergent angle θ is bypassed around the outsides of the front tires 1L, 1R and is redirected toward rear end portions of the front wheel houses 14L, 14R.

In the embodiment 1, an example is given in which the second flow redirection surface 8e (the flow redirection surface) is configured by a combination of the curved flow redirection surface 8e1 and the flat flow redirection surface 8e2. However, for example, the flow redirection surface may be configured by a gentle curved surface connecting the front apex portion and the outer end portion. Further, for example, the flow redirection surface may be configured by a combination of three or more curved surfaces.

In the embodiment 1, an example is given in which the front underfloor structure is applied to the electric vehicle EV. However, the present invention, of course, may be applied to the front underfloor structure of an electric vehicle such as a hybrid vehicle or a fuel cell vehicle, or may also be applied to the front underfloor structure of an engine driven vehicle. Incidentally, when the present invention is applied to the electric vehicle, battery cruising range is extended, so that an improvement in electric efficiency can be achieved. Also, when the present invention is applied to the engine driven vehicle, an improvement in fuel efficiency can be achieved.

This application is based upon and claims the benefit of priority of the prior Japanese Patent Application No. 2010-89336, filed on Apr. 8, 2010, the entire content of which is incorporated herein by reference.

INDUSTRIAL APPLICABILITY

In the present invention, the front apex portion of each of the front deflectors is disposed at the position closer to the vehicle center line which is inward in the vehicle width direction of the position of the inner surface of each of the front tires when straight, taking it into account that a flow of traveling air that flows in from the vehicle front flows toward the vehicle rear, diverging in the vehicle width direction. Thus, when a divergent flow of traveling air that flows toward the vehicle rear reaches the front apex portion of each of the front deflectors, the flow of traveling air is received by the flow redirection surface that connects the front apex portion and the outer end portion. The flow of traveling air received by the flow redirection surface is redirected by the flow redirection surface so as to be bypassed around the outer periphery side of each of the front tires. In this manner, the front deflectors each serve the flow redirection function for bypassing the flow of traveling air around the outer periphery side of each of the front tires, thereby to reduce the rate of flow of traveling air into the front tire regions where air drag is mainly caused on the front underfloor. Therefore, this enables reducing air drag produced by a flow of traveling air that flows around the front underfloor while traveling, thereby achieving desired improvements in aerodynamic characteristics.

REFERENCE SIGNS LIST

EV electric vehicle (as an example of a vehicle)
1L, 1R a pair of left and right front tires
2L, 2R a pair of left and right rear tires
3 front undercover
31 protruding portion with curved surface
4 motor room rear undercover
5 first battery undercover
6 second battery undercover
7 rear undercover
8L, 8R a pair of left and right front deflectors
8a front apex portion
8b inner end portion
8c outer end portion
8d first flow redirection surface
8e second flow redirection surface (or flow redirection surface)
8e1 curved flow redirection surface
8e2 flat flow redirection surface
9L, 9R a pair of left and right rear deflectors
TFR leading edge surface of tire when straight
TIN inner surface of tire when straight
CL vehicle center line
θ divergent angle
F tire streamline flux
FIN vehicle inside streamline flux
FOUT vehicle outside streamline flux
FMAIN main streamline flux of traveling air
WL dimension in vehicle width direction
SL dimension in longitudinal direction

The invention claimed is:

1. A front underfloor structure of a vehicle, comprising front deflectors disposed forward of front tires, respectively, in the vehicle and being configured to redirect a flow of traveling air that flows around a front underfloor while traveling, wherein
the front deflectors each comprise:
a front apex portion disposed at a position closer to the vehicle front than the position of a leading edge surface of each of the front tires when straight, and disposed at a position closer to a vehicle center line which is inward in a vehicle width direction of the position of an inner surface of each of the front tires when straight;
an outer end portion disposed at a position closer to the vehicle rear than the front apex portion, and disposed at a position outward in the vehicle width direction of the front apex portion; and
two flow redirection surfaces connecting the front apex portion and the outer end portion, and being configured such that, when struck by air traveling from the vehicle front, the two flow redirection surfaces redirect a flow of the traveling air to form an obliquely outward flow and a flow outward in the vehicle width direction.

2. The front underfloor structure of the vehicle, according to claim 1, wherein
the position of the front apex portion in a vehicle longitudinal direction and the position of the front apex portion in the vehicle width direction are determined based on a direction of a streamline of traveling air in which a flow of traveling air that flows in from the vehicle front in the vehicle longitudinal direction flows toward the vehicle rear, diverging in the vehicle width direction, in such a manner that the two flow redirection surfaces are struck by a flow of traveling air having a divergent angle, which flows in toward each of the front tires.

3. The front underfloor structure of the vehicle, according to claim 2, wherein
the two flow redirection surfaces redirect the flow of traveling air having the divergent angle, outward in the vehicle width direction to form the flow outward in the vehicle width direction.

4. The front underfloor structure of the vehicle, according to claim 3, wherein
one of the two flow redirection surfaces is a curved flow redirection surface configured to gradually redirect the flow of traveling air having the divergent angle so that the flow of traveling air becomes an obliquely outward streamline flux, and the other of the two flow redirection surfaces is a flat flow redirection surface configured to redirect the obliquely outward flow of air from the curved flow redirection surface, further outward in the vehicle width direction.

5. The front underfloor structure of the vehicle, according to claim 4, wherein
the position of the outer end portion in the vehicle width direction is disposed outward of a tire central axis of each of the front tires when straight.

* * * * *